US011095018B2

(12) United States Patent
Franco Garcia

(10) Patent No.: US 11,095,018 B2
(45) Date of Patent: Aug. 17, 2021

(54) MULTIPLE PHASE SHIFTER FOR ELECTROMAGNETIC WAVES OPERATING IN PARTICULAR IN A THREE-DIMENSIONAL MANNER

(71) Applicant: Abel Franco Garcia, Halluin (FR)

(72) Inventor: Abel Franco Garcia, Halluin (FR)

( * ) Notice: Subject to any disclaimer, the term of this patent is extended or adjusted under 35 U.S.C. 154(b) by 35 days.

(21) Appl. No.: 16/462,890

(22) PCT Filed: Oct. 10, 2017

(86) PCT No.: PCT/FR2017/052777
§ 371 (c)(1),
(2) Date: May 21, 2019

(87) PCT Pub. No.: WO2018/069631
PCT Pub. Date: Apr. 19, 2018

(65) Prior Publication Data
US 2020/0083596 A1    Mar. 12, 2020

(30) Foreign Application Priority Data

Oct. 10, 2016    (FR) ...................................... 16 59752

(51) Int. Cl.
*H01Q 1/24*        (2006.01)
*H01Q 17/00*       (2006.01)
*H04B 1/3827*      (2015.01)

(52) U.S. Cl.
CPC .............. *H01Q 1/245* (2013.01); *H01Q 1/24* (2013.01); *H01Q 17/00* (2013.01); *H04B 1/3838* (2013.01)

(58) Field of Classification Search
CPC .......... H01Q 1/245; H01Q 17/00; H01Q 1/24; H04B 1/3838

(Continued)

(56) References Cited

U.S. PATENT DOCUMENTS 8,276,259 B1 * 10/2012 Findley ............... H01F 17/0006
                                                        29/606
10,424,431 B2 * 9/2019 Valentin ................. H05K 1/165
(Continued)

FOREIGN PATENT DOCUMENTS

| EP | 1929579 A1 | 6/2008 |
| FR | 2860106 A1 | 3/2005 |
| GB | 2336472 A  | 10/1999 |

OTHER PUBLICATIONS

Jiunn-Nan, Hwang et al "Reduction of the Peak SAR in the Human Head With Metamaterials" IEEE Transactions on Antennas and Propagation, Dec. 1, 2006 IEEE Service Center, Piscataway, NJ, US—ISSN 0018-926X, vol. 54, Nr:12, pp. 3763-3770, XP011151446 , abstract and Figures 4 and 7.

*Primary Examiner* — Hai V Tran
(74) *Attorney, Agent, or Firm* — Craft Chu PLLC; Andrew W. Chu

(57) ABSTRACT

A multiple phase shifter for electromagnetic waves, having a plurality of phase-shifting modules. Each phase-shifting module includes at least two homothetic loops, electrically insulated from each other and connected together by two distinct interloop electrical connection elements at a first opening in each of the loops. The phase-shifting modules are electrically connected to at least one other phase-shifting module by two intermodule connection elements and are arranged in a plurality of groups. Each group includes at least two homothetic, concentric, interconnected phase-shifting modules. At least the outer loop of each group includes intergroup connectors having at least one pair of intergroup connection elements arranged at a first opening in the loop.

8 Claims, 5 Drawing Sheets

(58) Field of Classification Search
USPC .......................................................... 343/841
See application file for complete search history.

(56) References Cited

U.S. PATENT DOCUMENTS

| | | | | |
|---|---|---|---|---|
| 2008/0231534 A1* | 9/2008 | Franco Garcia | ....... | H01Q 17/00 |
| | | | | 343/842 |
| 2010/0001914 A1* | 1/2010 | Lavedas | ................... | H01Q 7/00 |
| | | | | 343/742 |
| 2014/0266974 A1* | 9/2014 | Sharawi | ................... | H01Q 1/48 |
| | | | | 343/893 |
| 2015/0303870 A1* | 10/2015 | Poddar | ................... | H01P 7/082 |
| | | | | 331/154 |

* cited by examiner

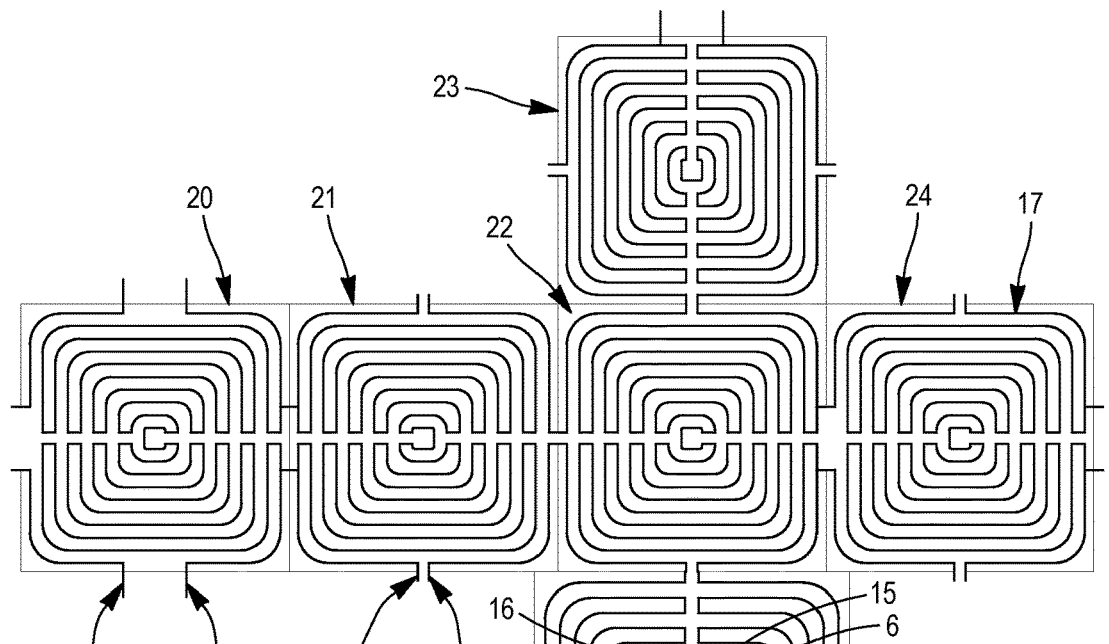
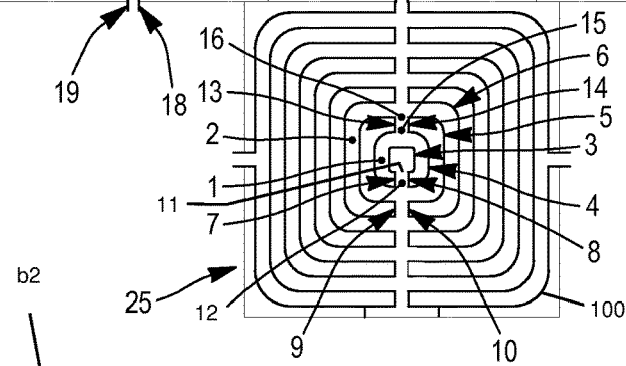
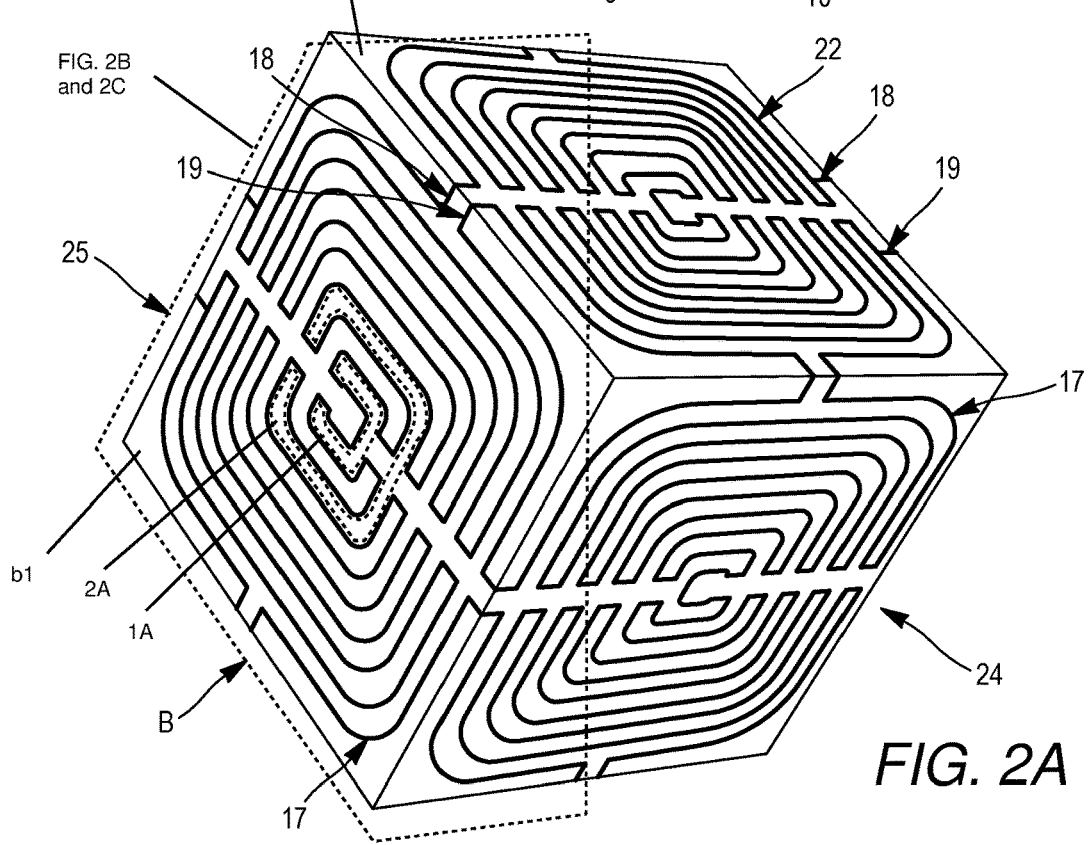
FIG. 1
FIG. 2A

MULTIPLE PHASE SHIFTER FOR ELECTROMAGNETIC WAVES OPERATING IN PARTICULAR IN A THREE-DIMENSIONAL MANNER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a multiple phase shifter for electromagnetic waves, the essential function of which is to act on these waves to decrease or eliminate their potentially harmful effects, and therefore to constitute protection for the users of the invention. The exact consequences of these waves in the human body are not precisely known, but their measurable effects are such that it is presumed that they may affect the health of the people subjected to them, in particular in case of prolonged or regular exposure.

2. Description of Related Art Including Information Disclosed Under 37 CFR 1.97 and 37 CFR 1.98

The technological developments that are the signature of today's world tend toward a multiplication of the sources of electromagnetic waves, and a constant increase in the possibilities for interaction thereof with the body, the most emblematic for example obviously consisting of cellular telephones.

This example is, however, far from isolated, and the cohort of apparatuses, devices and tools that emit electromagnetic waves and that are part of the daily entourage more or less close to the individual in the 21st century is constantly increasing: computers, tablets, Wi-Fi units, microwave ovens, low-energy bulbs, relay antennas, televisions, injection plates, etc.

As a reminder, according to the International Telecommunications Union, 7 billion mobile telephone subscribers were identified worldwide in 2014, i.e., roughly as many as there are inhabitants on our planet! This considerable number parallels the current estimate of 40 billion connected objects in 2020, which could generate a volume of data of more than 40,000 billion Gb.

Aside from telephony, it is realistic to believe that we are tending toward multiplication of all of these devices, and that the question of managing these waves in terms of public health, or rather in terms of protection, will arise more and more acutely as time goes on.

The theoretical debates today are polarized around the question of the harmfulness or safety of electromagnetic waves, no irrefutable evidence leading scientists to rule one way or the other. For the moment, no one is in fact able to define the level of dangerousness of electromagnetic waves, the medical world being divided between those who believe that there is a causal link between certain symptoms (headaches, dizziness, nausea, insomnia, etc.) and electromagnetic waves, and others who believe that this is pure speculation with no real basis.

The reality is, however, that we are constantly subject to them today, and that this situation will only become more pronounced in the future.

Among the indicators available to us, which try to assess the impact of electromagnetic waves, the specific absorption rate, or SAR, marks the quantity of energy conveyed by the radio waves received by the user, for example a mobile phone user, under the worst usage conditions. This index is measured in particular by using the temperature increase in the tissues. However, there are no studies providing a precise risk evaluation, which leads many operators in the field to recommend applying a precautionary principle.

From these reflections and observations, the applicant has already worked on the issue of protecting individuals from the effects of electromagnetic waves, and has in particular protected the results of its initial work, which for example appear in document EP 1,929,579.

The concept that is at the base of this work lies in the generation by the incident electromagnetic waves of phase-shifted waves that interfere with the incident waves and destroy their effects. The physical device developed to this end includes antennas that radiate when they are in the electromagnetic field, the antennas being provided so that the radiated rays interfere to create phase-shifted waves relative to the incident waves to achieve the aforementioned result. Configurations with looped antennas are used in fine to obtain rays having an appropriate phase-shifted value.

The problem is that the configurations shown in EP 1,929,579 are no longer sufficient to combat the exponential increase in all of the waves everywhere that individuals travel in the current societal environment, the ambient electromagnetic field resulting from multiple sources with a rapidly increasing number.

The described configurations are too limited; they only imperfectly respond to the new technical stakes raised by what must be called the explosion of sources generating electromagnetic fields, leading to the densification of an electromagnetic fog in which we are constantly bathed.

BRIEF SUMMARY OF THE INVENTION

The present invention aims to propose solutions obeying different configurations, albeit based on the same principle, and capable of facing said densification and its potentially harmful effects for the human body. It in fact makes it possible to protect all people who are in the immediate environment of the device according to the invention and no longer only those who were equipped with it if applicable.

There is therefore a distance effect, i.e., in particular a range much greater than that of the solutions proposed thus far.

To that end, but also in order to obtain many other advantages that will be obvious upon reading the continuation of the text, the multiple phase shifter for electromagnetic waves according to the invention has, as was already known, a plurality of phase-shifting modules each comprising at least two homothetic loops, electrically insulated from each other and connected together by two distinct inter-loop electrical connection elements at a first opening in each of said loops. It comprises, also conventionally, phase-shifting modules electrically connected to at least one other phase-shifting module by two inter-module connection elements electrically connecting one loop of each module at a second opening.

According to the invention, the device goes well beyond what was already known thus far in that it is such that the phase-shifting modules are arranged in a plurality of groups of phase-shifting modules, each group comprising at least two homothetic, concentric, interconnected phase-shifting modules, at least the outer loop of each group comprising intergroup connecting means consisting of at least one pair of intergroup connection elements arranged at an opening in said loop.

The groups thus formed in particular make it possible to produce an overall volume arrangement, i.e., multidimensional, but they also have the advantage of making it possible, owing to this particular configuration in groups, to increase the inherent effectiveness and range of the device. The number of antennas and their arrangement make it possible to greatly amplify the phase shift and guarantee a radiation with a substantially greater distance. In light of the dense cloud of ambient waves, and the complexity of the wave landscape resulting therefrom, the objective was to propose, from a known elementary configuration, a configuration generalization that allows a much more ample use adaptable to much more varied contexts.

According to one possible configuration, which further optimizes the configuration of the invention in relation to its objectives, each group of phase-shifted modules can comprise at least two subgroups of phase-shifting modules, each subgroup being conventionally made up of interconnected modules, with a regular alternation of concentric loops successively belonging to each subgroup. In this case, the density of the modules further increases and the overall effectiveness of the device is significantly improved as a result.

Preferably, it is the outer loop of each subgroup of phase-shifting modules that can comprise intergroup connection elements. The interconnection of the different groups is then done from electrical connections done from the periphery of the sets of concentric loops making up the interconnected modules. When loops belong to several subgroups and are interlaced, the peripheral loops of each subgroup are involved in the intergroup connection.

In practice, in a device according to the invention, each group is connected to all of the other groups of the device. The intergroup connection may, however, be direct, if the outer loops of each group are connected, or indirect if they go through a loop of an intermediate group.

According to one possible configuration, the phase-shifting modules of each group are made up of conductive tracks drawn on an insulating face of a housing making up a volume of several faces. In the case at hand, this is a three-dimensional structure that more completely deals with the surrounding electromagnetic waves, and increases the possibilities for managing the fog of waves that was previously discussed.

According to one possibility, the tracks forming the loops are substantially parallel to the separating edges of the faces, and they thus optimize the management of the space of the housings forming the invention.

In such a volume configuration, preferably, intergroup connection means are arranged on each face at the same level of the separating edges between two adjacent faces in which an intergroup connection is done. There is thus a possibility of a direct connection of each face to the faces that are directly adjacent to it, simply when the object is configured in three dimensions.

The apparatuses of the invention were subject to tests that showed their full potential to protect the person in an environment charged with electromagnetic waves. An apparatus called MSAS by the company Biomeridian, which did a noninvasive evaluation of the energy health of tested people, was in particular used to that end. Such an apparatus yielded an instantaneous result of the biological energy reaction of an individual for example subject to waves. The measured difference is in this respect extremely important, depending on whether the latter is equipped with the device according to the invention.

Even a relatively limited phase shift capacity makes it possible to communicate "information" to the cells, those of the nervous system in particular. This "antidote" information intended for the cells makes it possible, via the nervous system and a biocontrol mechanism that it implements, to provide good protection for the individual.

Tests, for example with cellular telephones, were done on subjects of both sexes of different ages and weights. Four different types/brands of mobile telephone devices were also used, to better demonstrate the effectiveness of the device.

Fundamentally, different scientific and technological studies have shown that mobile telephones have significant biological risks: in this respect, they are a good study subject to show the effectiveness of the invention. Due to their inherent power and their proximity to the human body during use, the pulsed waves of mobile telephones produce a radiation capable of increasing the temperature of the biological tissues in their users. The SAR, or "Specific Absorption Rate", of each device, to which reference was previously made, also provides an indication of the quantity of energy transmitted to the human body.

When the electromagnetic waves arrive on the body, one part of the wave is reflected while the other part is absorbed, and the orientation of the penetration changes at each interface encountered in the human body, for example between two different tissues of the body: skin-muscles, muscles-bones, bones-vessels, etc. Regarding the head, natural "target" for mobile telephones, after having passed through the skin, the muscles of the face, the bones, the electromagnetic waves penetrate more than 2 cm inside the brain.

Part of the absorbed electromagnetic energy is converted into heat, causing a temperature increase of the brain tissue: the conversion of the energy entering the tissues in fact causes an increase in kinetic energy of the molecules that absorb the electromagnetic waves. This is reflected by a molecular excitation with an oscillation of the bipolar molecules of water and phospholipids of the membrane, which constitute the majority of the living tissues. Through thermographic analyses, it is possible to show the heating action of the electromagnetic fields (EMF) of a cellular telephone on the face. The analysis of the images shows, relative to the subject and the control period, a significant temperature increase, primarily in the auricular region and especially after 10 minutes of telephone conversation.

The tests are done by measuring current at the middle finger of the left hand of the tested subject, first without the telephone apparatus, then with an apparatus not protected by the inventive system, and lastly with the protected apparatus.

The measuring test of the current done on each subject shows an average value of 50 micro-amperes empty, i.e., without the telephone. With the apparatus, one can see that the conductivity drops significantly. If a phase shifter according to the invention is used, there is a significant return to equilibrium of the unitary currents. The low variability of the observations has not required a study on larger samples.

In parallel, blood tests have been done, which also show the effectiveness of the device according to the invention, in all its forms. One can thus see, with an electron microscope, a blood sample taken from someone who has not been exposed to electromagnetic waves: the spatial distribution and the state of the blood cells considered to be normal are observed. The same experiment is repeated with a blood sample from an individual exposed to the electromagnetic waves of a cellular telephone for 5 minutes: one can see that the blood cells clump and that their external membrane becomes blurry. The same experiment is repeated with a person benefiting from a device according to the invention, also for 5 minutes: the cells remain almost normal, i.e., very close in their distribution and their appearance to those of the first viewing step.

BRIEF DESCRIPTION OF THE SEVERAL VIEWS OF THE DRAWINGS

The invention will now be described in more detail, in reference to the appended figures.

FIG. 1 shows a schematic view of an illustration of several groups with phase-shifting modules including square configuration loops, one of the groups being artificially enlarged so that the configuration details of the loops and phase-shifting modules of a group are better shown.

FIG. 2A shows a schematic view of the modules of FIG. 1 in three-dimensional structuring in a cube.

DETAILED DESCRIPTION OF THE INVENTION

Figure 2B:
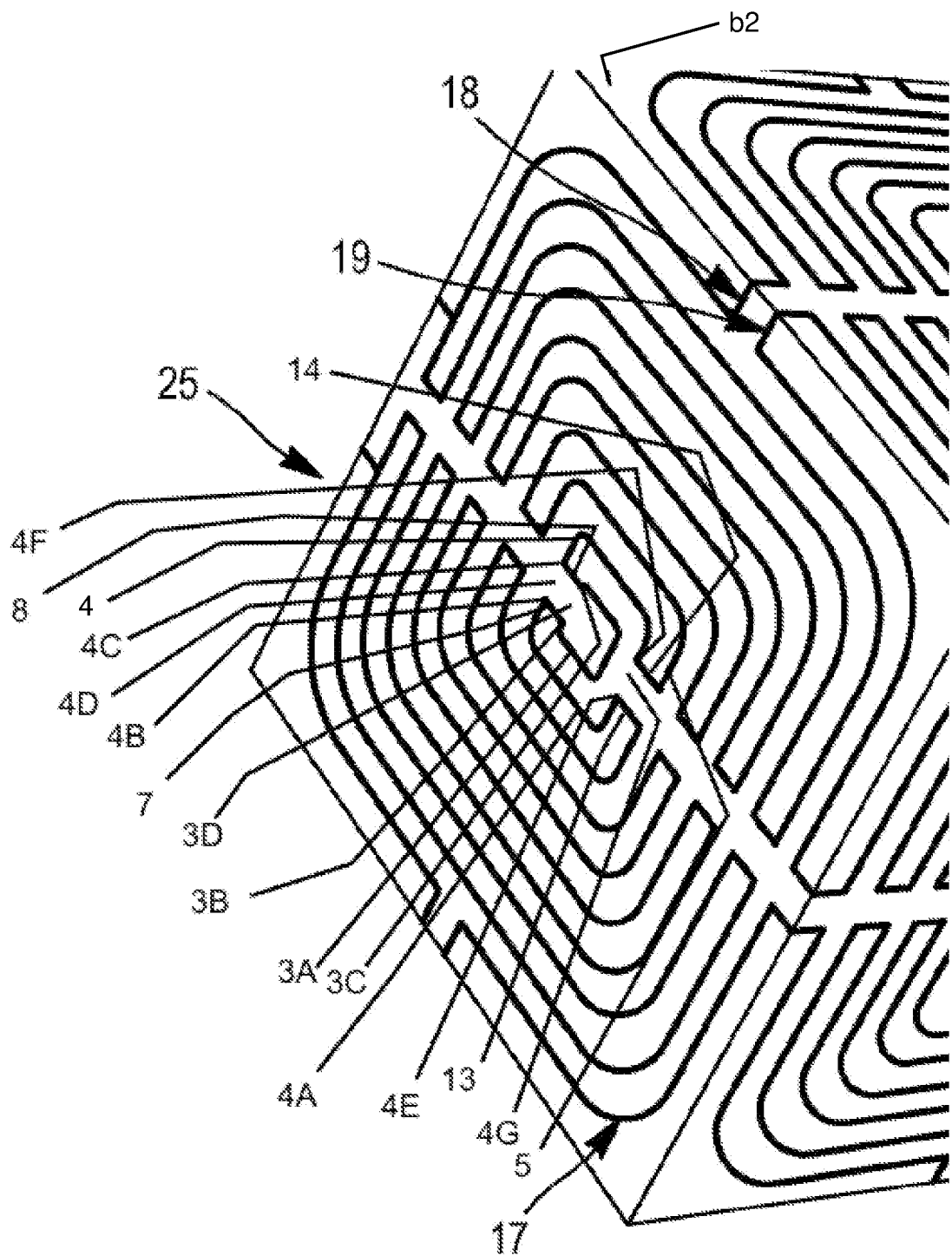
FIG. 2B shows an enlarged schematic view of FIG. 2A for the first inner loop portion 3 and first outer loop portion 4.

In reference to FIG. 1, the inventive device in the illustrated form comprises six groups 20, 21, 22, 23, 24 and 25 (including a first group 25 and a second group 22), the group 25 being artificially enlarged to better show the details thereof, but in reality having the same dimensions as the other groups. Each group 20, 21, 22, 23, 24 and 25 each includes five phase-shifting modules each equipped with two loops. All of the conductive elements forming the loops 3, 4, 5, 6 (a first inner loop portion 3, a first outer loop portion 4, a second inner loop portion 5, a second outer loop portion 6) and phase-shifting modules 1, 2 (a first module 1 and a second module 2) are made up of metallic tracks (metallic track 100), for example made from copper or cuprous alloy. The modules 1, 2 and loops 3, 4, 5, 6 shown in FIG. 1 have a substantially square configuration. These loops 3, 4, 5, 6 in the different modules 1, 2, as well as the modules 1, 2 between them are electrically insulated from one another (that is, there is an electrically insulated first module face 1A between the first inner loop portion 3 and the first outer loop portion 4 and an electrically insulated second module face 2A between the second inner loop portion 5 and the second outer loop portion 6), with the exception of the separate inter-loop and inter-module connection elements.

In order to simplify the description, only two phase-shifting modules 1, 2 first module 1 and a second module 2) from a first group 25, each including two loops 3, 4, 5, 6, (the first inner loop portion 3 and the first outer loop portion 4 form the first module 1, the second inner loop portion 5 and the second outer loop portion 6 form the second module 2) respectively, are subject to numerical references (the first inner loop portion 3 being comprised of a first inner loop length 3A with a first inner loop end 3B and a first inner loop opposite end 3C and a first inner loop opening 3D or first opening 11 of loop 3; the first outer loop portion 4 being comprised of a first outer loop length 4A with a first outer loop end 4B, a first outer loop opposite end 4C, a first outer loop linking end 4E, a first outer loop opposite linking end 4F, a first outer loop initial opening 4D or first opening 12 of loop 4, and a first outer loop linking opening 4G or second opening 15 of loop 4; the second inner loop portion 5 being comprised of a second inner loop length 5A with a second inner loop end 5B, a second inner loop opposite end 5C, a second inner loop linking end 5E, a second inner loop opposite linking end 5F, a second inner loop initial opening 5D, and a second inner loop linking opening 5G or second opening 16 of loop 5; the second outer loop portion 6 being comprised of a second outer loop length 6A with a second outer loop end 6B, a second outer loop opposite end 6C, a second outer loop linking end 6E, a second outer loop opposite linking end 6F, a second outer loop initial opening 6D or a first opening 12 of loop 6, and a second outer loop linking opening 6G of loop 6), which can be generalized to other loops and other modules. Thus, in the module 1, the two loops 3, 4 are connected to one another by the two separate inter-loop connection elements 7, 8, at a first opening 11 or first inner loop opening 3D and first outer loop initial opening 4D, respectively in each of the loops 3, 4. Then, in the module 2, the two loops 5, 6 are connected to one another by the two separate connecting elements 9, 10, at the second inner loop initial opening 5D and the second outer loop initial opening 6D in each of the loops 5, 6 respectively. Furthermore, the two modules 1, 2 are connected by two separate inter-module connecting elements 13, 14. Each of these inter-module connecting elements 13, 14 connects the first outer loop linking opening 4G, 15 of the first outer loop portion 4 and the second inner loop linking opening 5G, 16 of the second inner loop portion 5.

Figure 2C:
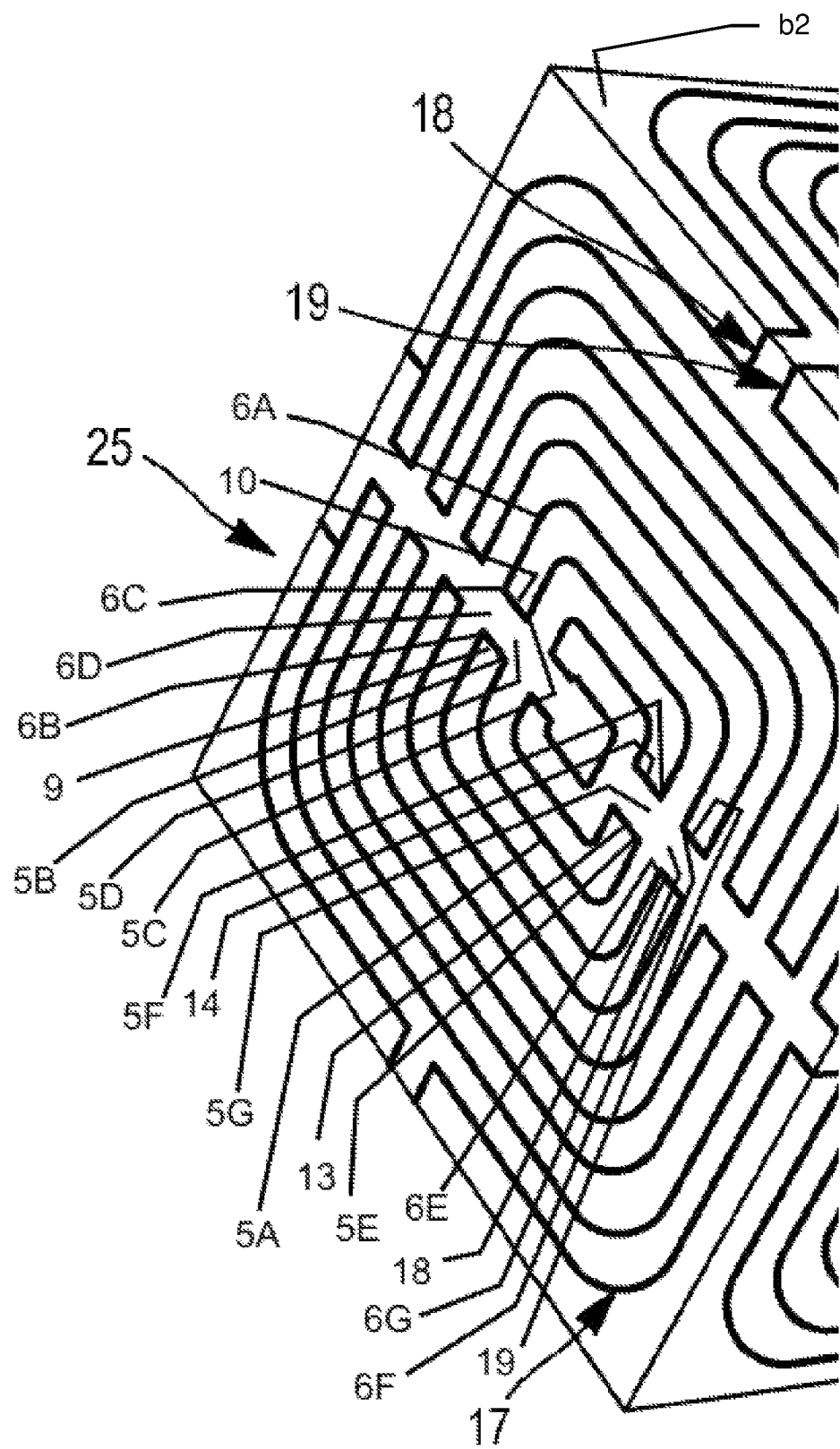
FIG. 2C shows an enlarged schematic view of FIG. 2A for the second inner loop portion 5 and second outer loop portion 6.

The modules and the loops that make them up, for example the loops 3 and 4 of the module 1, are in the same plane, and are—in the described configurations—substantially homothetic to one another. This plane is also that of the other phase-shifting modules, and in particular of the module 2 and its loops 5 and 6, which are also substantially homothetic to one another. It is lastly the plane of the other groups 21 to 25, at least in the preparatory configuration illustrated in FIG. 1, before three-dimensional volume structuring as shown in FIG. 2. All of the loops are homothetically identical in the plane of the groups, managing to generate electric currents with opposite directions in two adjacent loops, in turn generating electromagnetic fields in opposition.

The intergroup connections are done at the outer loop 17 of each group 20 to 25, in the form of two intergroup connecting elements 18, 19. The latter are present on all sides of said outer loop 17, in order to produce a conductive connection with all of the adjacent groups in the projected three-dimensional structure, a cube-shaped housing (B) (having a first face b1 and a second face b2), which is shown in FIG. 2A.

Figure 3:
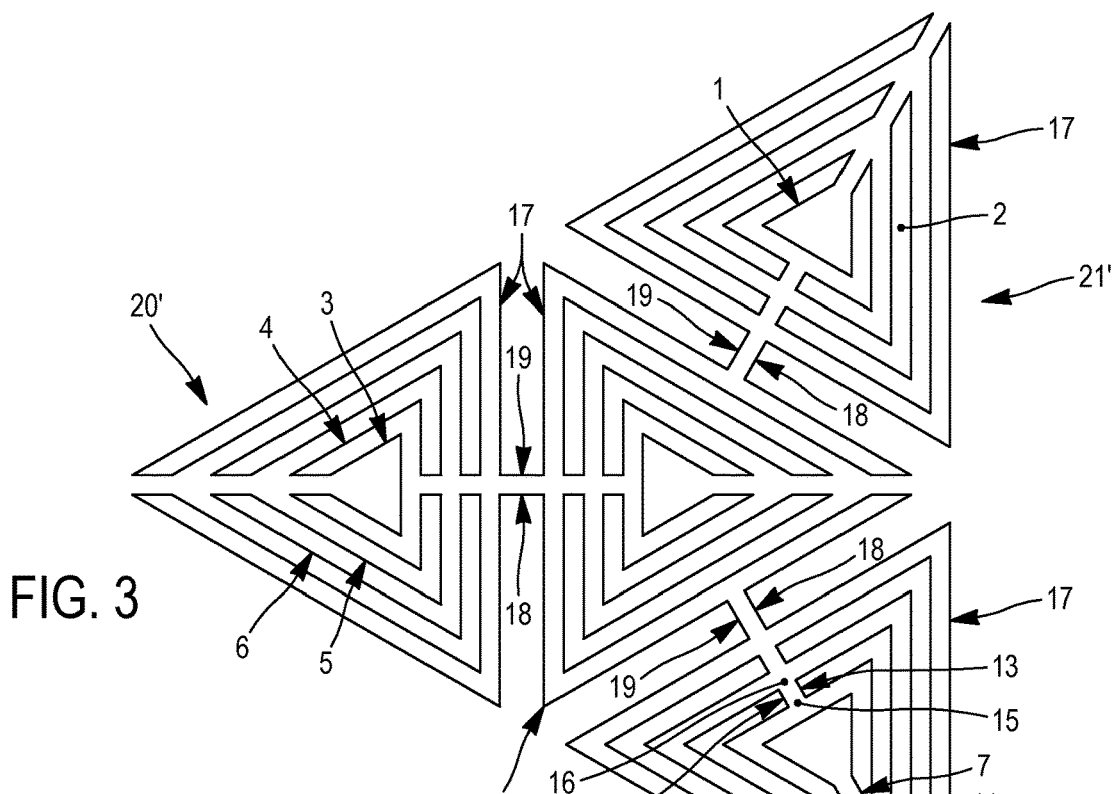
FIG. 3 is a schematic view of a version with several groups with phase-shifting modules including triangular loops.
Figure 4:
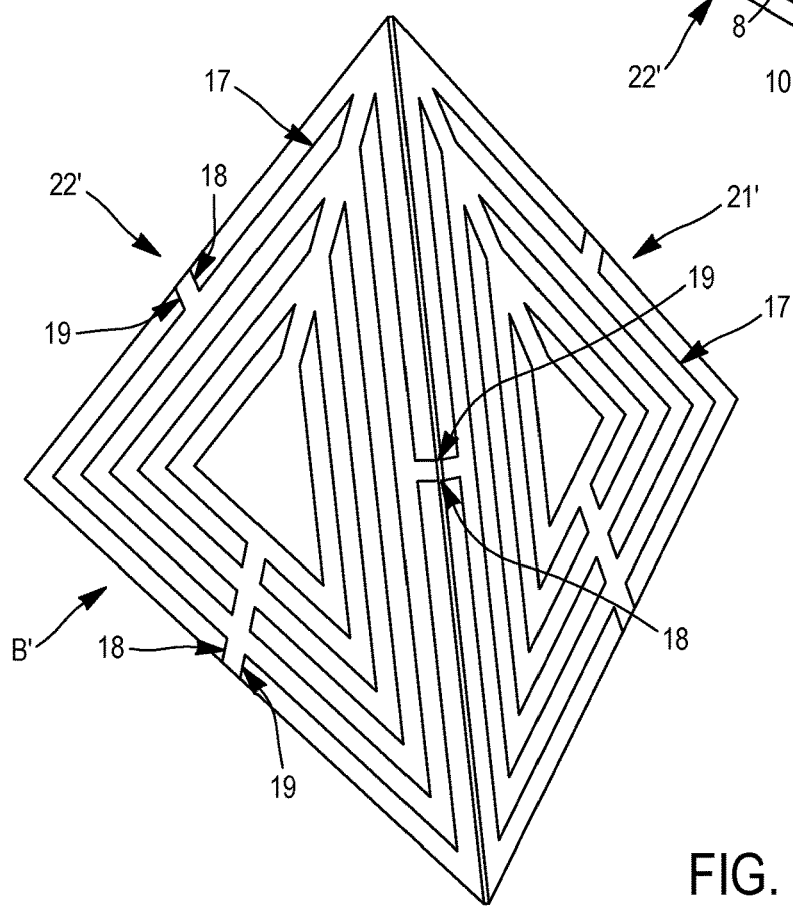
FIG. 4 is another schematic view, illustrating the modules of FIG. 3 in volume structure in a pyramid.

The following configuration, based on triangles next volume-structured in a pyramid, is shown in FIGS. 3 and 4. It obeys the same basic logic, i.e., two homothetic loops forming a phase-shifting module, then phase-shifting modules interleaved in one another to form a group whereof the delimitation, also triangular, is done by the outer loop 17 which can be a second outer loop portion 6, which is provided with two intergroup connecting elements 18, 19, which can be a second module outer connection element 18 and a second module outer opposite connection element 19 connected at the second outer loop linking opening 5G. Here, there are four groups 20', 21', 22', 23', corresponding to the four faces of the pyramid making up the corresponding volume, as shown in FIG. 4.

Each group in the case at hand is placed on the triangular face of the housing (B') of the three-dimensional pyramid of FIG. 4. It should be noted that it is in no way essential for the groups to be systematically connected to the groups of the adjacent faces, the connection being able to be done indirectly, the groups of some of the faces (of three faces in the example of the pyramid) then for example being connected to the group of a single and same face of the pyramid.

Figure 5:
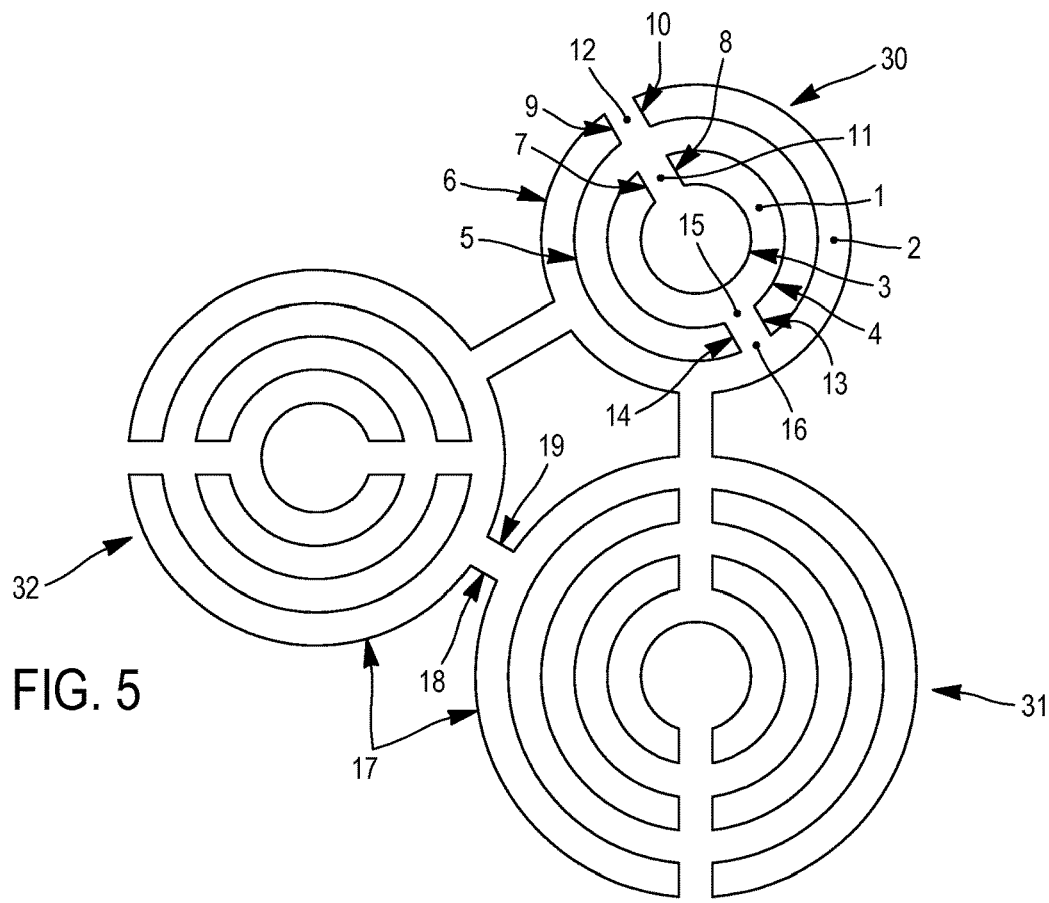
FIG. 5 shows a schematic view of a planar configuration made up of circular loops.
Figure 6:
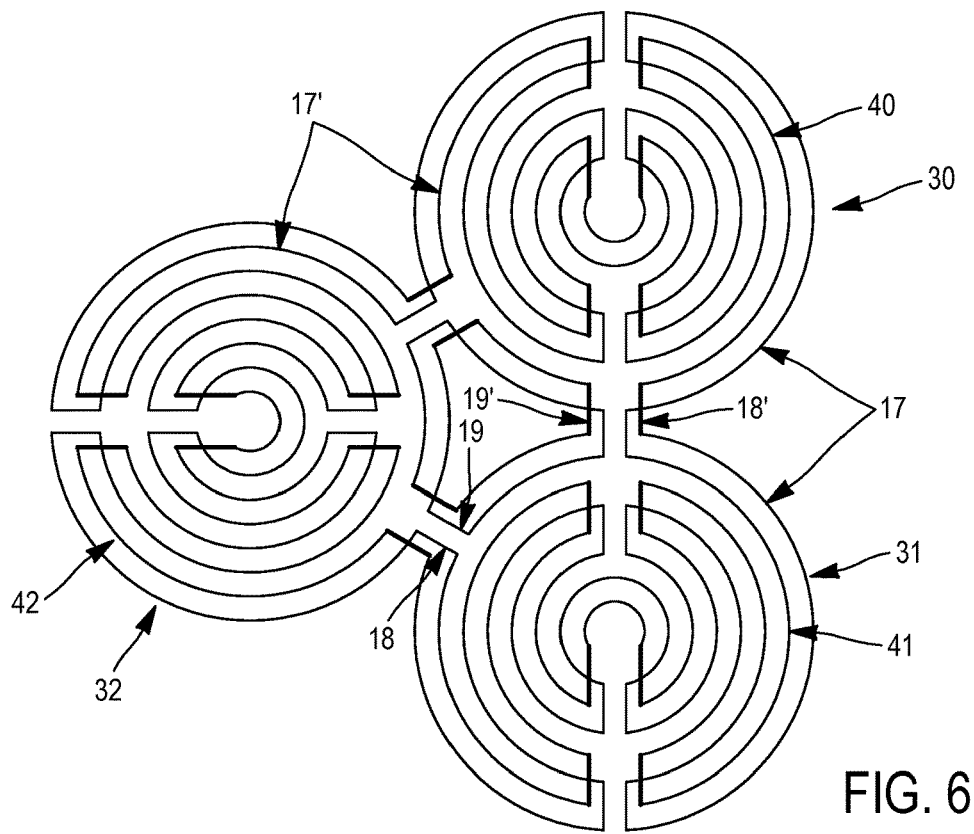
FIG. 6 shows a schematic view of a variant thereof with interlaced subgroups.

The same homothetic loops making up the interleaved phase-shifting modules, associated in connected groups 30, 31, 32, appear in FIGS. 5 and 6, showing another aspect of the structural richness of the invention: thus, in FIG. 5, the groups 30, 31, 32 are disparate in that they do not have the same number of phase-shifting modules.

In the variant of FIG. 6, each group includes two interlaced subgroups 30, 31, 32 and 40, 41, 42, and the intergroup connections are then done from loops 17, 17' outside each subgroup: the two outer loops 17, 17' together include four connection elements 18, 19, 18', 19', as shown in the figure.

The examples illustrated in the figures are not exhaustive with respect to the invention, which on the contrary encompasses all of the different variants and configurations of geometric shapes, for example polygonal. Likewise, combinations of features appearing in these figures can be done: use of subgroups in at least some groups, groups with different numbers of phase-shifting modules, etc.

I claim:

1. A multiple phase shifter for electromagnetic waves, comprising:
  a metallic track being comprised of:
    a first inner loop portion being comprised of:
      a first inner loop length with a first inner loop end and a first inner loop opposite end being opposite said first inner loop end, and
      first inner loop opening between said first inner loop end and said first inner loop opposite end,
    a first outer loop portion being comprised of:
      a first outer loop length with a first outer loop end, a first outer loop opposite end being opposite said first outer loop end, a first outer loop linking end, a first outer loop opposite linking end being opposite said first outer loop linking end,
      a first outer loop initial opening between said first outer loop end and said first outer loop opposite end, and
      a first outer loop linking opening between said first outer loop linking end and said first outer loop opposite linking end,
    a first module inner connection element between said first inner loop end and said first outer loop end,
    a first module inner opposite connection element 8 between said first inner loop opposite end and said first outer loop opposite end,
    a first module outer connection element connected to said first outer loop linking end, and
    a first module outer opposite connection element connected to said first outer loop opposite linking end,
  wherein said first outer loop portion is positioned around said first inner loop portion so as to form a first module,
  wherein said first outer loop portion is homothetic to said first inner loop portion, and
  wherein said first inner loop length is electrically connected to said first outer loop length only through said first module inner connection element and said first module inner opposite connection element so as to form an electrically insulated first module face between said first inner loop portion and said first outer loop portion.

2. The multiple phase shifter, according to claim 1, wherein said metallic track is further comprised of:
  a second inner loop portion being comprised of:
    a second inner loop length with a second inner loop end, a second inner loop opposite end being opposite said second inner loop end, a second inner loop linking end, a second inner loop opposite linking end being opposite said second outer loop linking end,
    second inner loop initial opening between said second inner loop linking end and said second inner loop opposite linking end, and
    second inner loop linking opening between said second inner loop end and said second inner loop opposite end,
  a second outer loop portion being comprised of:
    a second outer loop length with a second outer loop end, a second outer loop opposite end being opposite said second outer loop end, a second outer loop linking end, a second outer loop opposite linking end being opposite said second outer loop linking end,
    a second outer loop initial opening between said second outer loop end and said second outer loop opposite end, and
    a second outer loop linking opening between said second outer loop linking end and said second outer loop opposite linking end,
  wherein said first module outer connection element connects said first outer loop linking end to said second inner loop linking end,
  wherein first module outer opposite connection element connects said first outer loop opposite linking end to said second inner loop opposite linking end, a second module inner connection element between said second inner loop end and said second outer loop end, a second module inner opposite connection element between said second inner loop opposite end and said second outer loop opposite end, a second module outer connection element connected to said second outer loop linking end, and a second module outer opposite connection element connected to said second outer loop opposite linking end, wherein said second outer loop portion is positioned around said second inner loop portion so as to form a second module, wherein said second outer loop portion is homothetic to said second inner loop portion, wherein said second inner loop length is electrically connected to said second outer loop length only through said second module inner connection element and said second module inner opposite connection element so as to form an electrically insulated second module face between said second inner loop portion and said second outer loop portion, wherein said second inner loop portion is positioned around said first outer loop portion, and wherein said first module and said second module form a first group.

3. The multiple phase shifter, according to claim 2, wherein said metallic track is further comprised of a second group.

4. The multiple phase shifter, according to claim 3, wherein said second outer loop linking end and said second outer loop opposite linking end are connected to said second group.

5. The multiple phase shifter, according to claim 3, further comprising:

a housing having a first face and a second face, said metallic track being attached to said housing.

6. The multiple phase shifter, according to claim 5, wherein said first group is mounted on said first face, and wherein said second group is mounted on said second face.

7. The multiple phase shifter, according to claim 6, wherein said housing is comprised of a separating edge between said first face and said second face, said metallic track being parallel to said separating edge.

8. The multiple phase shifter, according to claim 7, wherein said second outer loop linking end 6E and said second outer loop opposite linking end 6F are connected to said second group at said separating edge.

* * * * *